United States Patent [19]

Gruner et al.

[11] Patent Number: 4,497,339

[45] Date of Patent: Feb. 5, 1985

[54] TWO-STAGE PRESSURE REGULATOR

[75] Inventors: George P. Gruner, Andover; Walter J. Diederich, W. Newbury, both of Mass.

[73] Assignee: The Gillette Company, Boston, Mass.

[21] Appl. No.: 408,549

[22] Filed: Aug. 16, 1982

[51] Int. Cl.[3] .............................................. F16K 31/14

[52] U.S. Cl. ................................ 137/495; 137/505.12; 431/89

[58] Field of Search ............... 431/89, 12; 137/505.12, 137/495

[56] References Cited

U.S. PATENT DOCUMENTS

| | | | |
|---|---|---|---|
| 2,002,884 | 5/1935 | Deming | 137/505.12 |
| 2,642,083 | 6/1953 | Strong | 137/495 |
| 2,662,348 | 12/1953 | Jacobsson | 137/505.12 |
| 2,793,504 | 5/1957 | Webster | 62/1 |
| 2,854,991 | 10/1958 | Webster | 137/322 |
| 3,118,494 | 1/1964 | Yost et al. | 158/130 |
| 3,183,686 | 5/1965 | Tissot-Dupont | 67/7.1 |
| 3,388,962 | 6/1968 | Baumann et al. | 431/344 |
| 3,699,998 | 10/1972 | Baranowski | 137/327 |
| 3,711,236 | 1/1973 | Kinsella et al. | 431/53 |
| 3,736,093 | 5/1973 | Bowman et al. | 431/89 |
| 3,812,877 | 5/1974 | Fleischhacker et al. | 137/505.42 |
| 3,941,554 | 3/1976 | Curtis | 431/89 |
| 3,955,913 | 5/1976 | Benzaria | 431/344 |
| 4,273,150 | 6/1981 | Paduch et al. | 137/508 X |

*Primary Examiner*—Randall L. Green
*Attorney, Agent, or Firm*—Raymond J. De Vellis

[57] ABSTRACT

A two-stage fuel regulator, adapted for operation in any orientation and over a wide temperature range, which includes a pressure limiter, a fuel vaporizer, a low pressure cutoff and an on/off switch. The first stage includes an inlet from a fuel storage tank where the fuel is maintained in a two-phase system of liquid and vapor. The tank inlet opens to one side of a diaphragm having a throughgoing hole surrounded by an annular valve face. A space on the other side of the diaphragm defines an expansion chamber. By adjusting the biasing force with which the valve face abuts a valve seat, the expansion chamber pressure may be maintained to be less, by a predetermined pressure difference (e.g., 1 psi), than the tank pressure, whereby vaporization of all fuel in the expansion chamber is assured. Additionally, whenever the tank pressure drops below the predetermined pressure difference (e.g., when the fuel supply is low or in a cold environment), passage of fuel into the expansion chamber is prohibited. The second chamber contains a second biased diaphragm coupled to an additional valve face and seat to limit the pressure at which gas is supplied for consumption. The additional valve face and seat may be manually controlled through an on/off switch.

10 Claims, 14 Drawing Figures

TWO-STAGE PRESSURE REGULATOR

BACKGROUND OF THE INVENTION

1. Field of the Invention

This invention relates to a hand-held lighting device (e.g., a flashlight), wherein light is radiated from a mantle which is heated to incandescence by the combustion of a gaseous fuel such as isobutane.

More particularly, the invention relates to a fuel regulator particularly adapted for use in such a hand-held lighting device.

2. Description of the Prior Art

Valves for regulating the delivery pressure of a gaseous fuel are well known in the art.

In a hand-held device powered by liquefied gas, it is advantageous to employ a regulator which will deliver fully evaporated fuel at a specified pressure, regardless of the tank pressure, ambient opreating termperature or orientation of the device.

An ordinary needle valve is subject to the limitation that its delivery pressure varies in accordance with the fuel tank pressure, and thus a needle valve must be constantly readjusted in accordance with the ambient temperature. In a portable unit, which may be used in various orientations the problem is aggravated, since if inverted, a needle valve has a tendency to pass liquid fuel, resulting in a sputtering and erratic flame.

A number of pressure regulators are known in which a biased diaphragm is coupled to a variable valving mechanism. Varying the bias on the diaphragm controls the delivery pressure. Examples of this type of pressure regulators are to be found in Webster, U.S. Pat. Nos. 2,793,504 and 2,854,991; Baranowski, Jr., U.S. Pat. No. 3,699,998; Bowman et al, U.S. Pat. No. 3,736,093; Fleischacker et al, U.S. Pat. No. 3,812,877; and Curtis, U.S. Pat. No. 3,941,554.

Under normal operating conditions, the above-described type of pressure regulator achieves the object of supplying gaseous fuel at a prescribed delivery pressure, independent of the tank pressure. However, at low temperatures, when the fuel tank pressure falls below the delivery pressure, this type of regulator will deliver unvaporized fuel, if the device in which it is employed has been inverted.

Another known type of flow control element employs a porous plug interposed in the fuel stream, which retards the flow and induces a pressure drop, thereby evaporating the fuel.

For example, in Baumann et al, U.S. Pat. No. 3,388,962, there is shown a portable torch in which a sintered metal plug is provided upstream of a needle valve.

Similarly, Tissot-Dupont, U.S. Pat. No. 3,183,686, discloses a compressible porous element positioned in the fuel supply stream. The porosity of the element may be adjusted by varying the degree of compression to which it is subjected.

Like needle valves, the delivery pressure provided by such porous flow retarders varies with the ambient temperature. Additionally, porous flow retarders do not completely overcome the problem of liquid fuel passage at low temperatures.

Another approach to preventing the passage of liquid fuel is shown in Benzaria, U.S. Pat. No. 3,955,913, in which a miniature torch, designed to be held in the hand like a pencil, has a fuel feed tube which extends to the center of the fuel tank, which is then filled to slightly less than half full. Such an arrangement unduly limits the fuel capacity of a given device and is vulnerable to sudden movements.

Considering that passge of liquid fuel is most likely when the tank pressure is extremely low, due to low operating temperatures, it is desirable to provide a low pressure cutoff.

In Yost et al, U.S. Pat. No. 3,118,494 and Kinsella et al, U.S. Pat. No. 3,711,236, there are shown low pressure cutoff devices employing solenoids energized by thermocouples deployed adjacent pilot burners. These devices are relatively expensive, complicated, and best suited for use in gas-fired water heaters and the like.

RELATIONSHIP TO OTHER APPLICATIONS

The aspirated pilot burner structure and associated ignition assembly described herein are claimed in a separate application (Ser. No. 408,551), now U.S. Pat. No. 4,475,882, by George P. Gruner entitled "Gas Mantle with Aspirated Pilot Light", filed concurrently with and assigned to the same assignee as the present application.

Similarly, the shock-absorbent mantle structure described herein is claimed in a separate application (Ser. No. 408,553), now issued, by George P. Gruner entitled "Shock Mounting for Incandescant Mantle, also filed concurrently with and assigned to the same assignee as the present application.

In another related application (Ser. No. 408,511), now U.S. Pat. No. 4,475,882, entitled "Gas Mantle Technology" by Walter J. Diederich, also filed concurrently and assigned to thè same assignee as the present application, there is disclosed a particularly fracture resistant mantle, a process for making the mantle and a process for attaching the mantle to a mounting structure.

The three above-identified related applications are hereby expressly incorporated by reference.

SUMMARY OF THE INVENTION

To overcome the above-mentioned disadvantages, an object of the present invention is the provision of a two-stage pressure regulator, capable of delivering vaporized gaseous fuel at a given pressure, regardless of orientation and over the entire operating temperature range.

Another object of the present invention is to provide a simple and reliable low pressure cutoff in such a regulator, thereby preventing the passage of liquid fule at low operating temperatures.

A still further object of the present invention is the provision of a positive shutoff means in such a regulator.

In general, the invention features a regulator having a first chamber with a fuel intake port; a first diaphragm dividing the first chamber into upstream and downstream compartments, the upstream compartment being in fluid communication with the fuel inlet port; first valve means for maintaining a predetermined pressure difference between the upstream and downstream compartments; a second chamber having a fuel outlet port and including a second diaphraghm; and second valve means for establishing fluid communication between the downstream compartment and the second chamber whenever the pressure in the second chamber falls below a predetermined level and for blocking fluid communication between the downstream compartment and the second chamber whenever the pressure in the second chamber equals or exceeds the predetermined level.

The above and other features of the invention will be made clear through a description of a preferred embodiment, reference being had to the accompanying drawings, wherein:

DESCRIPTION OF THE PREFERRED EMBODIMENT

Figure 1:
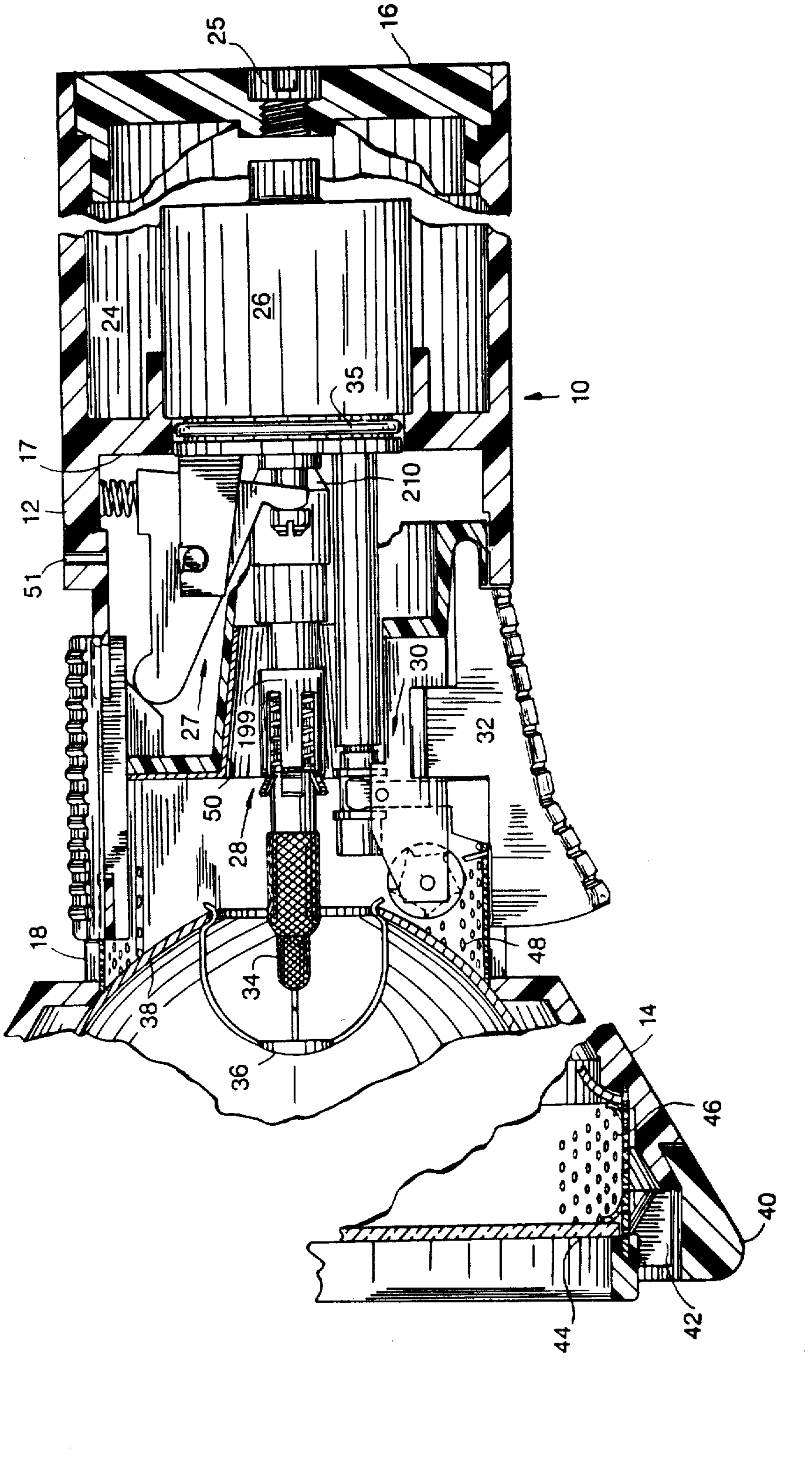
FIG. 1 is a side elevational view, partially broken away, of a gas-powered flashlight according to the invention.

Referring now to FIG. 1, a disposable gas-powered flashlight, indicated generally by reference numeral 10, is housed in a modular housing assembly consisting of an extended octagonal housing portion 12, a flared frustroconical housing portion 14 and a rear end cap 16. Flared housing portion 14 is joined to housing portion 12 by radially disposed connecting pillars 18. Preferably, these housing components are molded from a relatively high impact plastic, such as Delrin TM and, in the disposable embodiment shown and described, are permanently joined by one of a number of conventional techniques well known in the art, such as press fitting, spin welding, ultrasonic welding, etc.

An inwardly extending wall portion 17 serves to form a fuel chamber 24 in the rear interior of housing portion 12. A two-stage regulator assembly 26 is generally disposed within fuel chamber 24 and projects through an opening in wall portion 17. A surrounding O-ring 35 prevents leakage of fuel around regulator assembly 26.

In the disposable embodiment shown, fuel chamber 24 is adapted to be charged with liquified gas during manufacture by the provision of a fill plug 25 in end cap 16. In a refillable embodiment, however, end cap 16 may be detachable from the remainder of the housing assembly (e.g., through mating threads) to permit access to a replaceable fuel tank disposed immediately interior thereof. Alternatively, fill plug 25 could be replaced with a check valve for recharging fuel chamber 24 from a conventional fuel cannister.

Forward of wall portion 17, housing portion 12 generally encloses the following assemblies: a manual on/off switch assembly 27, a mantle assembly 28, a pilot assembly 30, and an ignition assembly 32.

A mantle 34 is mounted on the forward free end of mantle assembly 28 such that it projects into flared housing portion 14, where it is disposed centrally of a spider-shaped heat shield 36 and an essentially conventional parabolic reflector 38, both of which are also enclosed within flared housing portion 14.

Mantle 34 may be of the well known type referred to as a Wellsbach mantle, which consists of a thoria-ceria refractory produced by impregnating a fiber sock with appropriate metal compounds and then removing the fiber by oxidation.

Prior art mantles of this type have suffered from the drawback that they are quite fragile. However, in the above-identified application of Walter J. Diederich entitled "Gas Mantle Technology", there is disclosed a process for manufacturing a mantle which is significantly more fracture resistant than mantles heretofore known. Preferably, mantle 34 is manufactured according to the process taught by this application.

Still referring to FIG. 1, the forward end of flared housing portion 14 is adapted to receive an annular rim 40 of a shock absorbent material (e.g., rubber), which snaps over housing portion 14 and which is provided with a number of radially disposed slots 42. Rim 40 additionally serves to position a translucent lens 44 and a perforated metallic ring 46, having a maximum perforation diameter of 1/25 of an inch, which encircles the interior of housing portion 14 immediately adjacent slots 42. A second perforated metallic ring 48, also having a maximum perforation diameter of 1/25 of an inch, encircles the housing immediately adjacent connecting pillars 18.

Heat generated during operation of the flashlight is effectively carried away by air flowing through slots 42 and between connecting pillars 18. The particular construction shown and described promotes the formation of such convective air currents, regardless of the flashlight's orientation.

It is known that an open flame cannot travel through a circular restriction having a diameter of 1/25 of an inch or less or, correspondingly, an unrestricted area of 0.00125 square inch. Accordingly, perforated rings 46 and 48 provide the safety feature of a flame arrestor means for confining the flame at mantle 34 within the housing assembly 12.

To obtain the brightest and hottest flame, mantle 34 is supplied with an air/gas mixture. The air enters mantle assembly 28 through a primary air intake 210 provided just downstream of regulator assembly 26. For this purpose, housing portion 12 is provided with a number of primary air intake ports 51. To eliminate the necessity of having to provide additional flame-arresting means adjacent primary air intake ports 51, and to provide an additional barrier between mantle 34 and fuel chamber 24, an internal shield 50 encircling the interior of housing portion 12 is provided. Shield 50 is of generally dog-legged shape in cross-section and has a lower portion which is disposed at a forwardly flaring oblique angle with respect to both mantle assembly 28 and pilot assembly 30. Shield 50 encircles both mantle assembly 28 and pilot assembly 30. The interior terminal edge of shield 50 laps slidingly against the exterior surfaces of mantle assembly 28 and pilot assembly 30 downstream of primary air intake 210. The flared shape of shield 50 and the sliding contact which it makes with mantle assembly 28 and pilot assembly 30 accommodates transverse flexing of asesmblies 28 and 30 with minimum interference of these members, such as in response to transverse shock forces. Additionally, such a sliding contact presents an unobstructed area of less than 0.00125 square inch. Accordingly, the interior of the housing assembly is substantially divided, from a flame-arresting perspective, into forward and rearward compartments, with the flame at mantle 34 confined to the forward compartment.

The construction and operation of the various assemblies referred to above will now be described in more detail.

Regulator Assembly

It will be appreciated by those skilled in the art that a gas-powered flashlight which may be employed in any orientation and at various ambient temperatures raises special considerations regarding the supplying of fuel to the active element, in this case, mantle 34. In particular, the flow of liquid fuel to mantle 34 in an unvaporized state is undesirable, since such unvaporized flow results in a fluttering and unreliable flame and, in general, poor illumination. Moreover, if a sufficient amount of unvaporized fuel were to reach mantle 34, a potentially hazardous flare-up could occur.

In a gas-powered lighting device not specifically designed for multiorientated operation, e.g., a conventional lantern, unvaporized fuel flow is effectively prevented by the simple expedient of locating the fuel feed at an upward portion of the fuel tank. Since gaseous fuel under pressure normally exists in a two-phase system of liquid and gas, with the liquid residing at the bottom of the fuel tank and the gas being disposed thereover, such an upwardly located fuel feed assures the supply of only vaporized fuel, assuming the lantern is maintained upright. If inverted, however, there is no assurance that all of the fuel supplied will be completely vaporized, particularly at low operating temperatures. This is in contrast to regulator assembly 26, shown in detail in FIGS. 2 and 3.

Regulator assembly 26 generally includes a first stage 52 and a second stage 54, both stages being contained within a cylinder-shaped regulator housing 56. The rear face of housing 56 is open to provide access to its interior for the assembly of various components therein, while the front face of housing 56 is generally closed by a front wall 58, on which are integrally formed an offset mantle mounting stud 60 and an offset pilot tube 62, and through which passes a centrally located hole 64.

Figure 3:
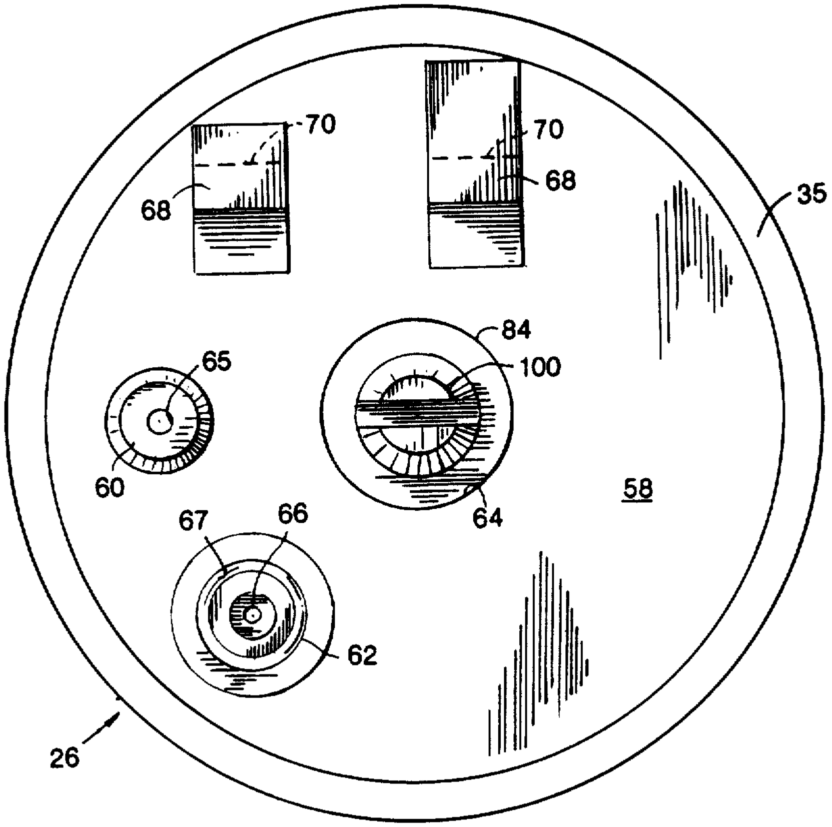
FIG. 3 is a front elevational view of the regulator of FIG. 2.

Holes 65 and 66, best seen in FIG. 3, pass through the central axes of mantle mounting stud 60 and pilot tube 62, respectively, and communicate with the interior of housing 56. Pilot tube 62 is provided with a counter bore 67. Additionally, front wall 58 has integrally formed therewith two cantilevered standards 68,68 having arcuate bearing surfaces 70,70.

As will be discussed more fully below, mantle assembly 28 and pilot assembly 30 are cantilevered from housing 56 by mounting them on mantle stud 60 and pilot tube 62, respectively, and the material from which housing 56 is integrally formed is chosen for its frequency response and oscillatory damping characteristics. Preferably, housing 56 is formed of a plastic such as Delrin TM.

Mounted within housing 56 and adjacent front wall 58 is a plate member 72 having an internally threaded circular sleeve portion 74 projecting forward of an annular shoulder 76. An annular groove 78 is formed in shoulder 76. Plate member 72 also includes a rearwardly extending cylindrical portion 80 having a longitudinal groove 82 formed on the external face thereof. Plate member 72 is disposed within housing 56 such that sleeve portion 74 mates within hole 64, whereupon grooves 78 and 82 define a passageway leading around cylindrical portion 80 to holes 65 and 66.

An externally threaded cylindrical nut 84, having a stepped bore longitudinally therethrough so as to present an annular shoulder 86, is mated within circular sleeve 74 of plate member 72.

Opposed to plate member 72 is a generally cup-shaped second stage diaphragm 88 having a forwardly projecting annular sidewall 90 and a centrally protruding guide portion 92. Guide portion 92 is provided with a threaded blind hole 96 and an annular shoulder 94. Diaphragm 88 is nested within plate 72, such that sidewall 90 is in abutment with cylindrical portion 80 and guide portion 92 projects through the stepped bore of nut 84.

A screw 100 mates with threaded hole 96 and thus forms an extension of guide portion 92. A coil spring 98, positioned between shoulders 86 and 94, biases diaphragm 88 to the right as viewed in FIG. 2, the spring compression being adjustable via nut 84. A circular bearing pad 102 is mounted in a recess provided on the rearward face of diaphragm 88.

Figure 2:
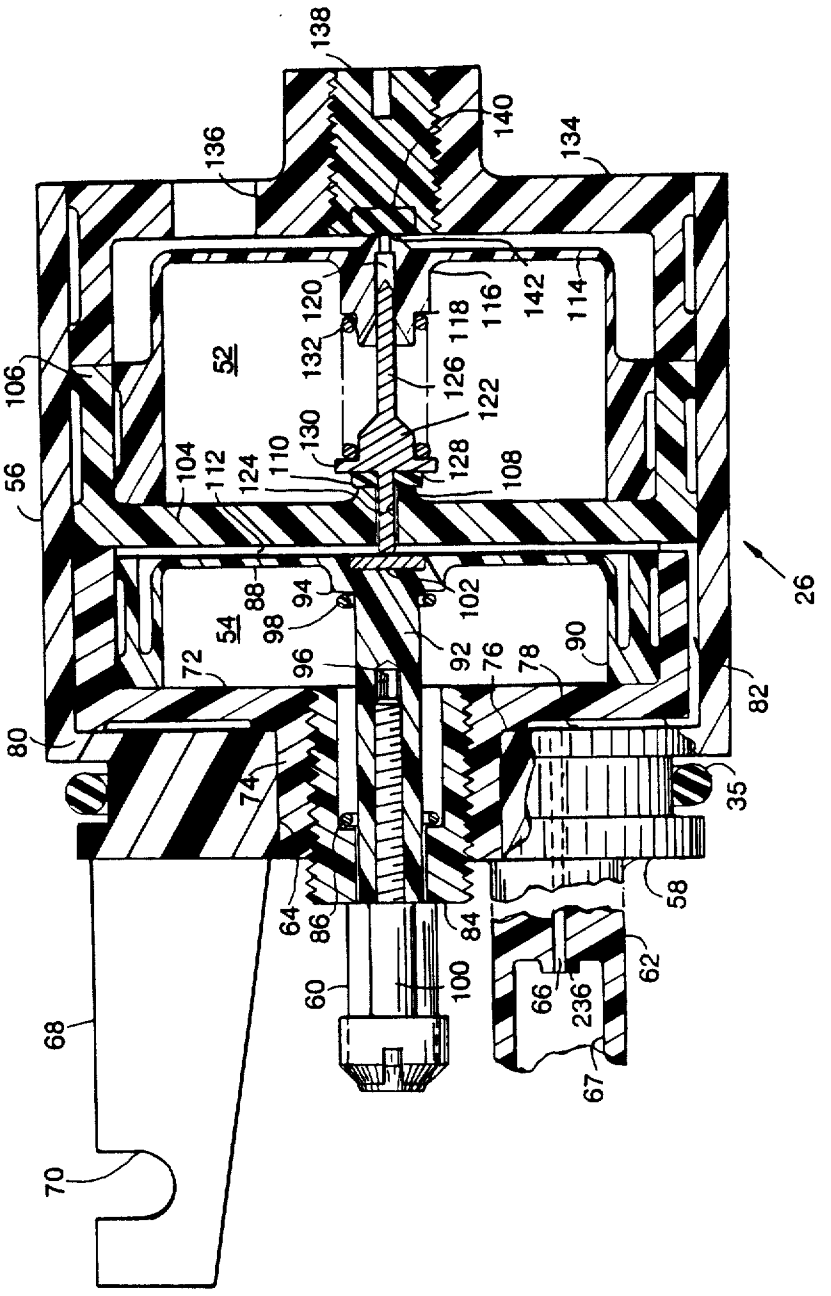
FIG. 2 is a detailed sectional view of a two-stage fuel regulator, provided in the flashlight of FIG. 1.

A pin retainer member 104 having a rearwardly projecting annular sidewall 106 and a central throughgoing hole 108 encircled by a valve seat 110 serves to separate first and second stages 52 and 54. As shown in FIG. 2, the dimensioning of plate member 72 and diaphragm 88 is such that a chamber 112 is formed between the opposing faces of diaphragm 88 and pin retainer member 104. Chamber 112 is in fluid communication with holes 65 and 66 through grooves 78 and 82.

A generally cup-shaped first stage diaphragm 114 having a projecting central portion 116 with an annular flange 118 surrounding a throughgoing hole 120 of stepped diameter is nested within pin retainer member 104.

A valve member 122 having forward and rearward extending stem portions 124 and 126, respectively, a valve face 128 and an annular flange 130 is disposed such that forward stem portion 124 projects through hole 108 to contact bearing pad 102, while rearward stem portion 126 is positioned within hole 120. A coil spring 132 positioned between flanges 118 and 130 serves to bias valve member 122 forward such that valve face 128 abuts valve seat 110 and, at the same time, urges diaphragm 114 rearward.

A press-fitted end cap 134 seals regulator housing 56. End cap 134 includes a fuel intake port 136 and a central throughgoing threaded plug 138 provided with a valve seat 140, which coacts with a second valve face 142 provided on the rearward face of diaphragm 114 surrounding hole 120. Rotation of plug 138 determines the contact force between valve seat 140 and valve face 142.

In operation, regulator assembly 26 provides fuel in a gaseous state, regardless of orientation and over the entire range of operating temperatures, the pressure of gas supplied being limited to a predetermined value. Additionally, the fuel flow is terminated when the tank pressure falls below a predetermined level, and may also be positively shutoff.

In manufacture, first stage regulator 52 is adjusted by advancing or withdrawing plug 138, to adjust the contact force between valve face 142 and valve seat 140 and thereby provide for a one psi pressure difference between intake aperture 136 and the interior of first stage regulator 52 (i.e., the pressure to the left of diaphragm 114, as viewed in FIG. 2). In other words, the contact force between valve face 142 and valve seat 140 (i.e., the biasing force exerted by spring 132 when the valve is in a fully closed position) is adjusted to correspond to a one psi pressure difference between the gas pressures acting on the forward and rearward faces of diaphragm 114. Thus adjusted, the valve will remain closed (i.e., valve face 142 will remain in contact with valve seat 140) whenever the pressure to the left of diaphragm 114 is equal to or greater than one psi less than the prevailing pressure within fuel chamber 24. Conversely, should the pressure within first stage regulator 52 fall below this predetermined level of fuel chamber pressure less one psi, diaphragm 114 will quickly move leftward, admitting more high pressure gas from fuel intake port 136 past valve face 142 and valve seat 140, through hole 120, between stem 124 and hole 120 to raise the first stage pressure (i.e., the pressure to the left of diaphragm 114) to the desired level of fuel supply tank pressure less one psi.

The preferred one psi pressure difference has been chosen to assure complete evaporation of isobutane fuel over the entire range of ambient temperatures to which the flashlight might be exposed, down to that temperature at which the gas pressure within the supply tank falls below one psi. Below that temperature, the first stage valve remins closed since the minimum pressure differential of one psi required to open the first stage can no longer be provided. Of course, a different pressure drop can be chosen. However, a smaller pressure drop tends to make the regulator work less reliably, whereas a larger pressure drop further limits the operating range at low temperatures.

In addition to assuring complete fuel evaporation, the above-described construction and adjustment of first stage regulator 52 provides a low pressure cutoff feature. For example, if the regulator is adjusted to provide for a one psi pressure drop, then passage of fuel into first stage regulator 52 will be inhibited whenever the pressure in fuel chamber 24 falls below one psi. Without this first stage feature, liquid fuel will enter the regulator whenever an attempt is made to operate the flashlight in an inverted position at such a low temperature that the supply tank pressure is at or below that pressure which the regulator calls for (e.g., 7 or 8 psi). Passage of liquid fuel will cause blockage of the small orifice designed to feed the gaseous fuel to the mantle. Moreover, the regulating function of the regulator is negated when the flashlight is subsequently exposed to a higher temperature.

Second stage regulator 54 is adjusted by rotation of nut 84 to vary the bias exerted by spring 98 on diaphragm 88. In practice, it has been found preferable to limit the pressure of gas in chamber 112 to be on the order of seven to eight psi. Properly adjusted, gas pressures in chamber 112 less than such desired pressure exert insufficient force on diaphragm 88 to overcome the force of spring 98, whereupon rightward movement of diaphragm 88 displaces valve member 122 rearward to increase the gaseous fuel flow through hole 108 past stem 124. Conversely, higher than desirable gas pressures in chamber 112 occasion a forward movement of diaphragm 88 and an accompanying decrease of the gas flow through hole 108.

On/Off Switch Assembly

Figure 4:
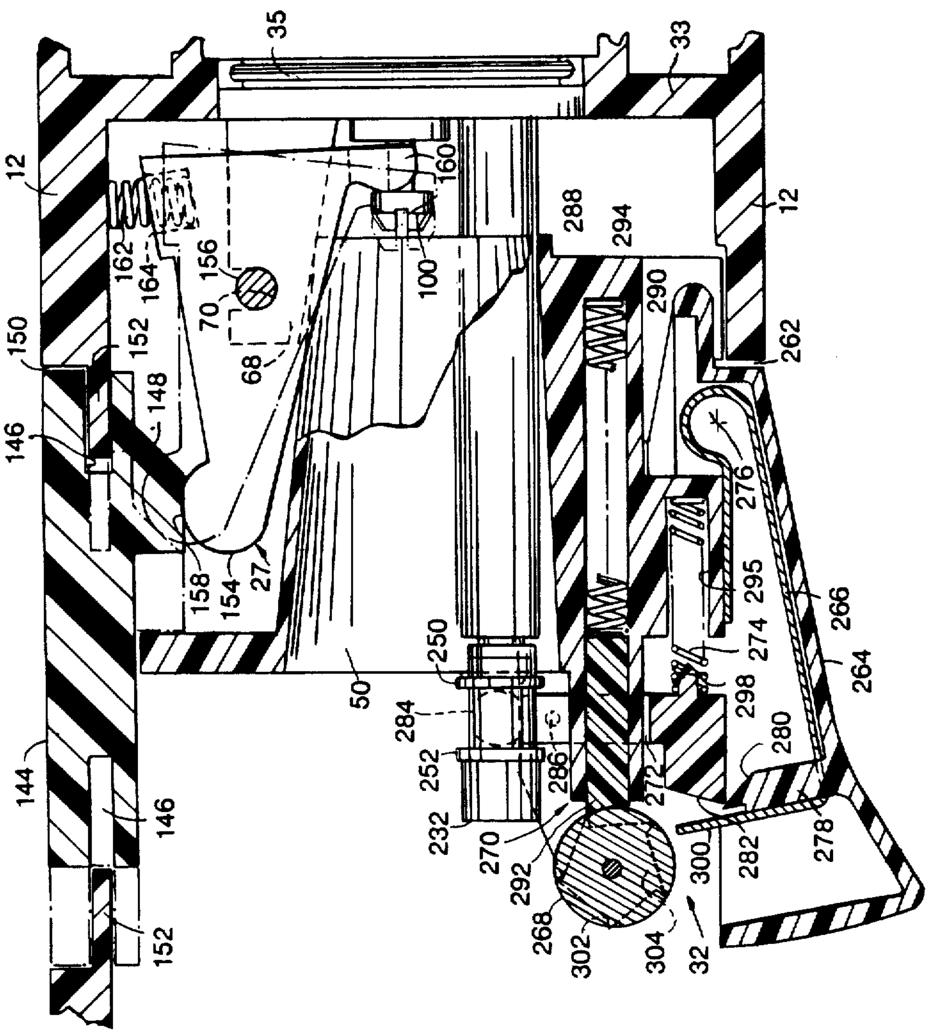
FIG. 4 is a sectioned elevational view of the central portion of the flashlight of FIG. 1, showing a manual on/off switch mechanism and an ignition mechanism thereof in greater detail.
Figure 5:
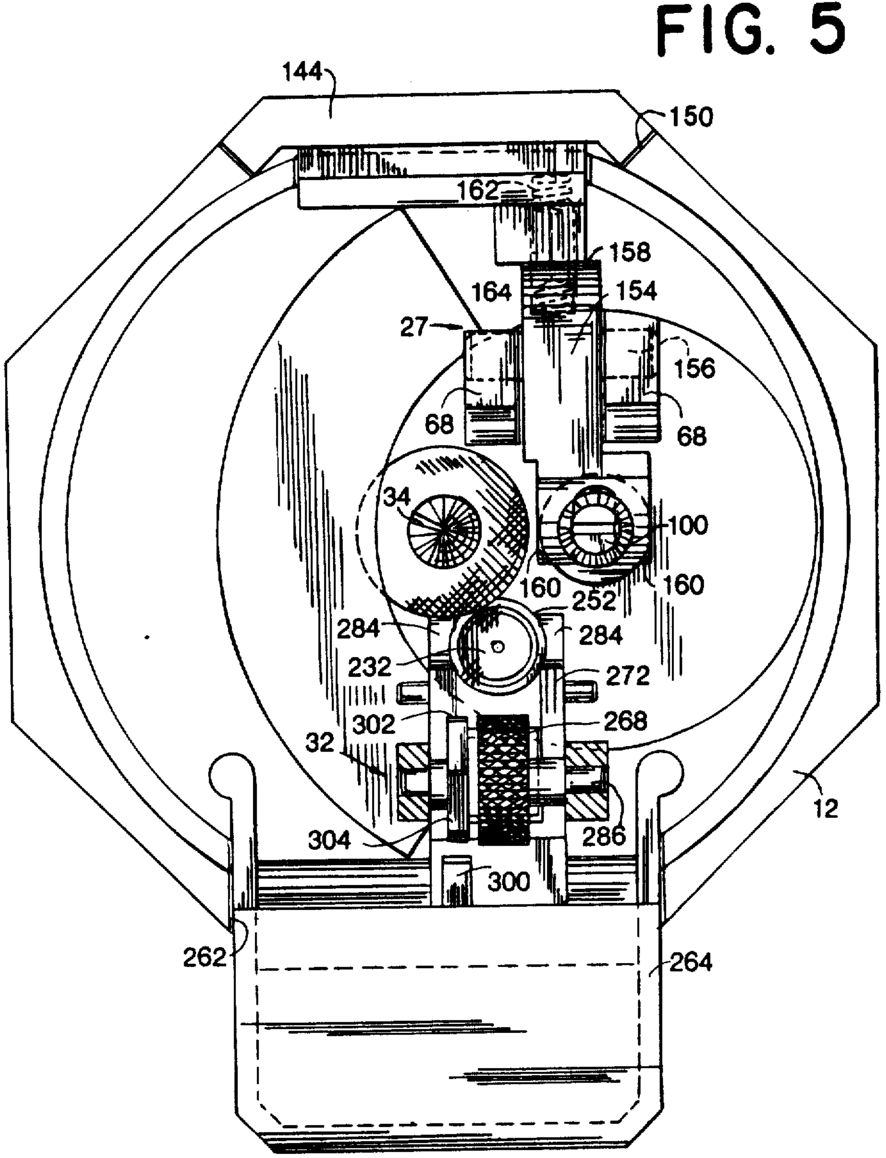
FIG. 5 is a front sectional view of the flashlight of FIG. 1.

Referring now to FIGS. 4 and 5, on/off switch assembly 27 includes an on/off switch 144 having recessed bearing slots 146,146 and a raised camming surface 148. Switch 144 is mounted within an opening 150 in housing portion 12 of the flashlight housing assembly. Opening 150 is provided with bearing extensions 152,152 of reduced thickness dimensioned to engage bearing slots 146,146 and thereby provide for reciprocal sliding movement of switch 144.

A lever 154, rotatable about a pivot pin 156 and having a cam following surface 158 and regulator claws 160,160, is disposed inside housing portion 12 and adjacent switch 144. Pin 156 is carried on arcuate bearing surfaces 70,70 formed on cantilevered standards 68,68 described above.

A coil spring 162 is positioned within a spring cage 164 which is formed within lever 154. Spring 162 bears against the inside wall of housing portion 12 and biases lever 154 in a clockwise direction as viewed in FIG. 4, about pin 156 to the position indicated in phantom.

The stem of screw 100 is disposed between claws 160,160 and is free to move with respect thereto. However, the head of screw 100 is too large to pass between claws 160,160.

When switch 144 is aligned in its forwardmost (or "off") position, lever 154 is biased by spring 162 in a clockwise direction to the position shown by broken lines in FIG. 4. In such a configuration, claws 160,160 engage the head of screw 100 and urge both screw 100 and diaphragm 88 to their forwardmost range of travel. As a result, the force exerted by bearing pad 102 on valve stem 124 is insufficient to overcome the forward biasing effect of spring 132, and valve face 128 and valve seat 110 remain firmly in contact, such that the flow of gas from first stage 52 to second stage 54 is prevented.

To initiate gas flow, switch 144 is moved rearward to its "on" position, thereby rotating lever 154 to the solid line position shown in FIG. 4 and removing the restraining effect exerted by claws 160,160 on screw 100. This in turn frees diaphragm 88, which then moves to a position of equilibrium between the forces exerted on its forward face by spring 98 and the gas pressure exerted on its rearward face.

Mantle Assembly

Figure 6:
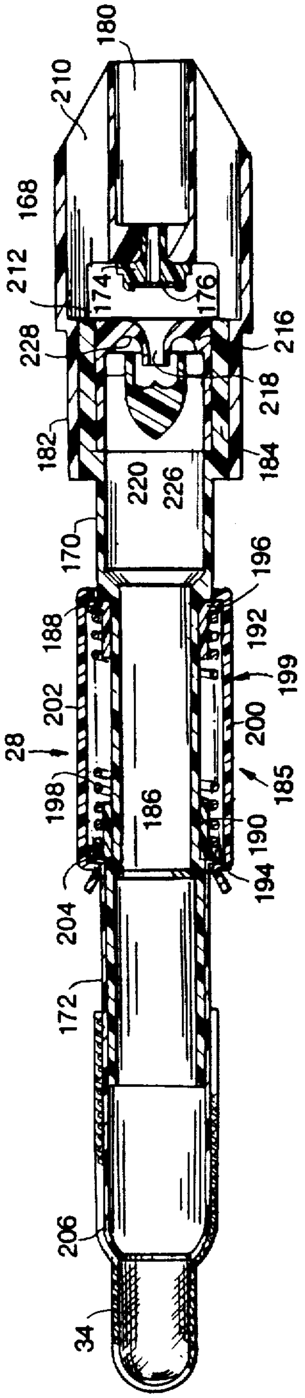
FIG. 6 is a sectioned elevational view of a mantle mounting assembly of the flashlight of FIG. 1.

Referring now to FIG. 6, mantle assembly 28 includes an orifice holder 168, a first tube 170 and a second tube 172, which are coaxially mated to form an elongated structure. An orifice housing 174 carrying an orifice plate 176, is mounted within orifice holder 168. Orifice plate 176 is provided with a small throughgoing orifice having a diameter of approximately 1.2 to 1.4 mils. The rearward portion of orifice holder 168 is provided with a counterbore 180 dimensioned to be press-fit over mantle mounting stud 60, such that mantle assembly 28 is secured, in a cantilever fashion, to regulator assembly 26.

Orifice holder 168 is additionally provided with a forwardly extending sleeve portion 182, adapted to receive an enlarged radial portion 184 of first tube 170, which snugly mates therein in a press-fit fashion.

The radial dimensioning of first and second tubes 170 and 172 is such that relative axial movement therebetween is possible, and shock absorbtion in the axial direction is provided by an axial shock absorbtion assembly 185, which acts to bias this relative axial movement.

First tube 170 is provided with a portion of reduced external diameter, thus forming two annular bearing surfaces 186 and 188. Forward and rearward split collars 190 and 192 encircle first tube 170 and are provided with outstanding annular flanges 194 and 196, respectively, which abut surfaces 186 and 188 and are limited in their range of axial movement thereby. A coil spring 198 positioned between flanges 194 and 196 biases split collars 190 and 192 apart from one another and against surfaces 186 and 188.

The rearward portion of second tube 172 is also provided with an outstanding annular flange 204, which abuts flange 194 of split collar 190. A four-pronged spring clip 199 (see FIG. 1), two prongs of which are depicted by reference numerals 200 and 202 in FIG. 6, serves to contain spring 198 and complete the assembly.

The most forward section of first tube 172 is provided with a tapered portion 206 to which mantle 34 is shrunk-fit or otherwise attached. Preferable, mantle 34 is attached as taught in the above-identified application of Walter J. Diederich entitled "Gas Mantle Technology".

The structure of mantle assembly 28, in particular the structure of orifice holder 168, first tube 170 and second tube 172, generally defines a conduit for the mixing and supply of an air/gas mixture to mantle 34. In this regard, orifice holder 168 is constructed with an annular air inlet 210 surrounding counter bore 180 and an expansion chamber 212, which interconnects with air inlet 210 through a plurality of apertures. Inlet 210 is disposed rearward of partition 50, as shown in FIG. 1, and is thus supplied with primary air via primary air inlet ports 51.

Figure 7:
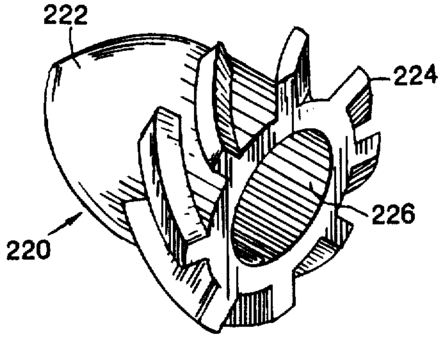
FIG. 7 is a perspective view of a deflection structure positioned in both a mantle gas flow conduit and a pilot gas flow conduit of the flashlight of FIG. 1.

Mounted within sleeve portion 182, immediately forward of orifice plate 168, is a holder 216 having a tapered inlet passage 218 and enclosing a deflection structure 220. Deflection structure 220, shown in more detail in FIG. 7, includes a bullet-nosed forward portion 222 surrounded by radially extending deflection vanes 224.

Deflection surfaces 226 and 228 provided on deflection structure 220 and holder 216, respectively, serve to twice reverse the flow of the air/gas mixture, while expanding the mixture is an outward radial direction, thereby promoting thorough mixing.

As seen most clearly in FIG. 6, the dimensioning of holder 216 and deflection structure 220 is such that deflection structure 220 is maintained concentrically within holder 216 by vanes 224, e.g., by press-fitting, and the resultant subassembly is retained in a press-fit fashion within radial portion 184.

The elongated cantilevered mounting structure formed by press-fitting counterbore 180 over mantle mounting stud 60 has been found to be effective in isolating mantle 34 from transverse shock forces. Such transverse shock forces produce an oscillatory motion of mantle assembly 28, the extent and duration of which depend to a large extent on the material chosen for regulator housing 56. Various plastics such as Delrin (TM) have frequency response and damping characteristics which have been found to make them good choices for construction of regulator housing 56.

Shock absorbtion assembly 185 permits mantle assembly 28 to undergo both axial elongation and compression in response to shock forces in either axial direction. Axial compression is effected by relative rearward movement of second tube 172 and split collar 190 against the biasing force exerted by spring 198. Axial elongation is effected through relative forward movement of second tube 172, spring clip 199 and split collar 192, again against the resistance of spring 198.

Figure 8:
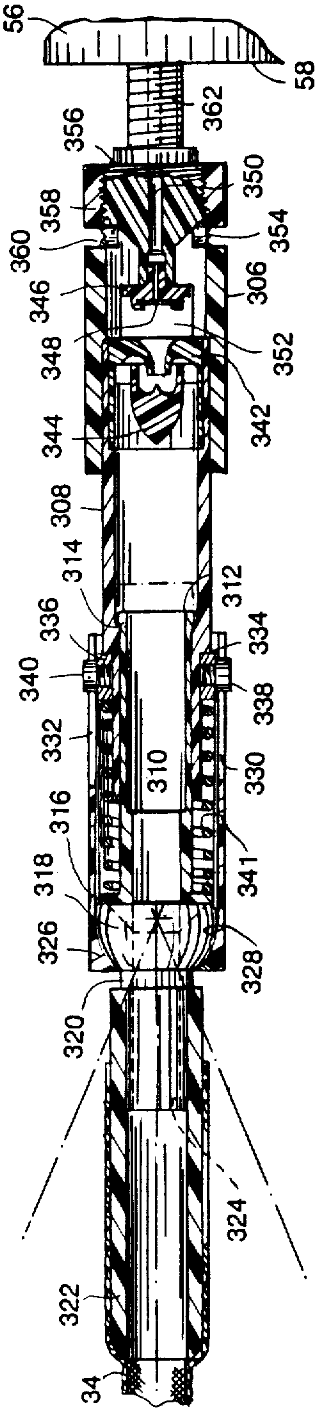
FIG. 8 is a sectioned elevational view of another mantle mounting assembly for use in the flashligh of FIG. 1.
Figure 9A:
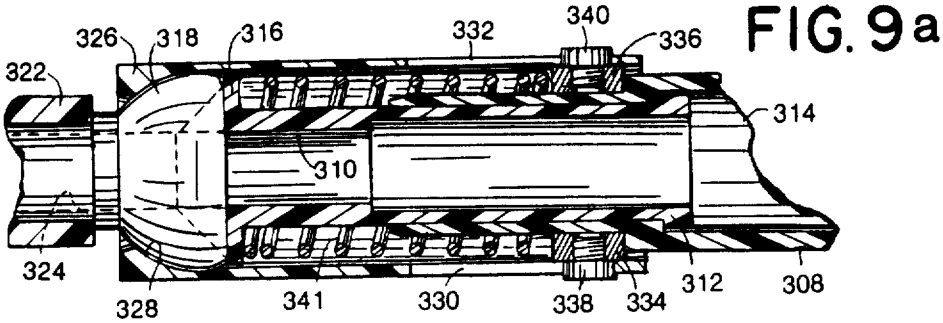
FIGS. 9 (a), (b), (c) and (d) are sectioned elevational views of the mantle mounting assembly of FIG. 8, displaced by the action of various shock forces hereinafter described.
Figure 9B:
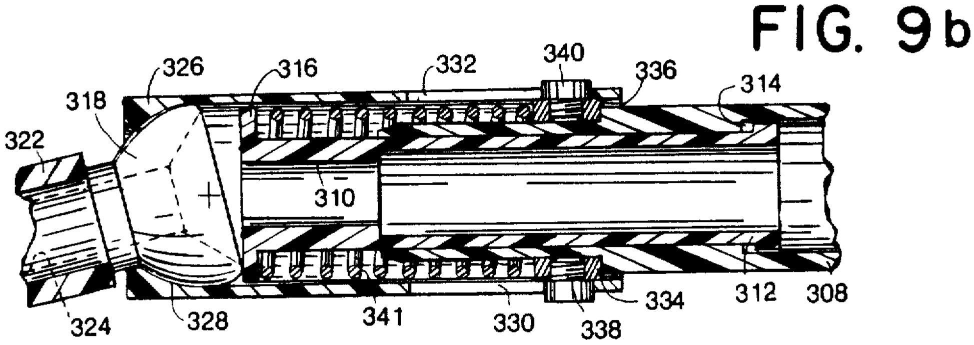
Figure 9C:
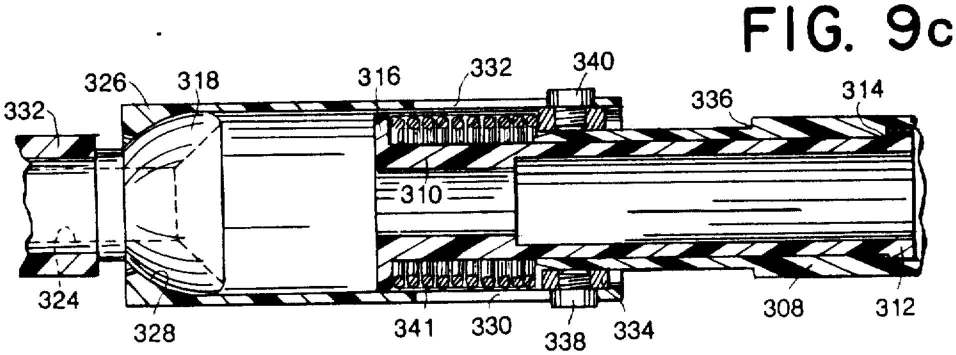
Figure 9D:
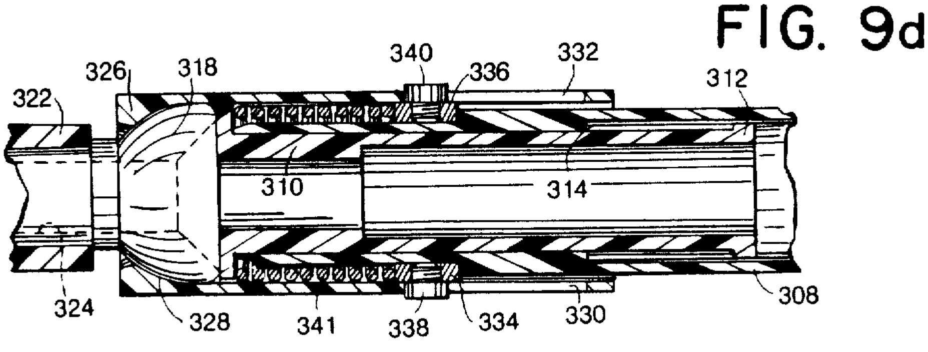

FIG. 8 shows an even more preferred embodiment of mantle assembly 28 in an unstressed state. Generally, an orifice holder 306 is coaxially press-fit with a first tube 308, into which is slidingly mated a second tube 310. Second tube 310 has a rearward outstanding flange 312 which, in the neutral position shown in FIG. 8, abuts an annular shoulder 314 formed on the inner surface of first tube 308. Second tube 310 also has a forward outstanding flange 316 which abuts a knuckle member 318 of generally semispherical shape.

Knuckle member 318 has a forwardly extending tube portion 320 which snugly mates with a mantle mounting tube 322 upon which is mounted mantle 34. Knuckle member 318 is also provided with a throughgoing rearwardly flared hole 324.

A generally cylindrical cage 326 has a knuckle socket 328 formed in its forward portion and longitudinal slots 330 and 332 cut in its rearward periphery. A collar 334 slidingly surrounds first tube 308 and, in an unstressed state, abuts an annular shoulder 336 formed thereon. Screws 338 and 340 project through slots 330 and 332, respectively, and engage threaded holes provided in collar 334. A coil spring 341 extends between flange 316 and collar 334.

Orifice holder 306 encloses a holder 342, a deflection structure 344, a orifice housing 346 and an orifice plate 348 which are substantially similar to the corresponding elements described above with respect to FIGS. 6 and 7.

Fuel is supplied through a gas passageway 350 to an expansion chamber 352 forward of orifice plate 348, and a number of radially disposed air intake ports 354 are provided in orifice holder 306 which connect with expansion chamber 352. A threaded portion 356 is disposed immediately adjacent air intake ports 354. An internally threaded collar 358 mates with threaded portion 356 and is adjustable with respect thereto to create an air gap 360, the size of which determines the intake of primary air through air intake ports 354.

A threaded extension 362 on the rearmost portion of orifice holder 306 secures mantle assembly 28, in a cantilevered fashion, to front wall 58 of regulator housing 56.

The embodiment of mantle assembly 28 shown in FIG. 8 reduces the axial and transverse shock forces transmitted to mantle 34 due to the provision of a biased knuckle joint in the mantle mounting structure.

FIG. 9(*a*) shows the knuckle joint in its nominal unstressed position, with flange 312 abutting shoulde4r 314, collar 334 abutting shoulder 336 and screws 338 and 340 disposed at the back of slots 330 and 332.

In FIG. 9(*b*), the knuckle joint is shown in a flexed position in response to transverse shock forces. In this configuration, the canting of knuckle member 318 is biased by a slight compression of spring 341, with second tube 310 moving rearwards with respect to first tube 308 as shown by the formation of a slight gap between flange 312 and shoulder 314.

FIG. 9(*c*) shows the disposition of the various components when the knuckle joint is fully extended. In this case, as in FIG. 9(*a*), flange 312 abuts shoulder 314 and, therefore, further forward movement of second tube 310 is prevented. However, cage 326 and collar 334 have moved forward together as a unit, compressing spring 341 and creating a considerable gap between collar 334 and shoulder 336.

In FIG. 9(*d*), the knuckle joint is shown in its fully compressed state. Here second tube 310 and cage 326 have both been translated rearwards with respect to first tube 308, creating a significant gap between flange 312 and shoulder 314. Additionally, screws 338 and 340 are, in the fully compressed state, disposed at the forward edges of slots 330 and 332.

Pilot Assembly

Figure 10:
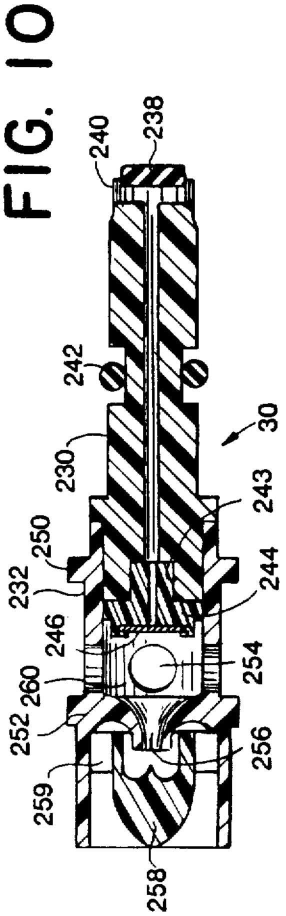
FIG. 10 is a sectioned elevational view of a pilot assembly of the flashlight of FIG. 1.

Referring now to FIG. 10, pilot assembly 30 generally includes a pilot stem 230 and a holder 232 and, referring to FIG. 2, is cantilevered from regulator assembly 26 by a press-fit of the rearward portion of stem 230 into counterbore 67 at the forward end of pilot tube 62. Counterbore 67 terminates in an annular pilot valve seat 236 surrounding hole 66. A pilot valve seal 328 is mounted in a valve seal retainer 240 constructed at the rearward portion of pilot stem 230.

An O-ring 242 mounted in an annular groove provided on stem 230 and positioned within counterbore 67 serves to seal the valving mechanism. The forward portion of stem 230 is press-fit within holder 232 and is provided with a counterbore 243 for retaining an orifice housing 244. An orifice plate 246 is mounted in orifice housing 244 and has a throughgoing orifice with a diameter on the order of approximately 2.4 mils.

Holder 232 is provided with two spaced, outwardly projecting annular flanges 250 and 252, which, as discussed below, cooperate with ignition assembly 32 to control the flow of gas to the pilot burner tip, and between which are provided a number of circumferentially spaced air inlets 254. Holder 232 is further provided with a tapered gas passageway 256 and a deflection structure 258, which is maintained concentrically within holder 232 by a number of deflection vanes 259.

Inlets 254 connect with an expansion chamber 260 and provide an air pathway to promote complete combustion of the pilot gas and thereby substantially prevent the accumulation of soot on lens 44 and other interior portions of the housing assembly. Reference is made to the above description of holder 216 and deflection structure 220 as regards the mixing of the air and gas effected by the portion of holder 232 forward of inlets 254 and by deflection structure 258.

Ignition Assembly

Figure 11:
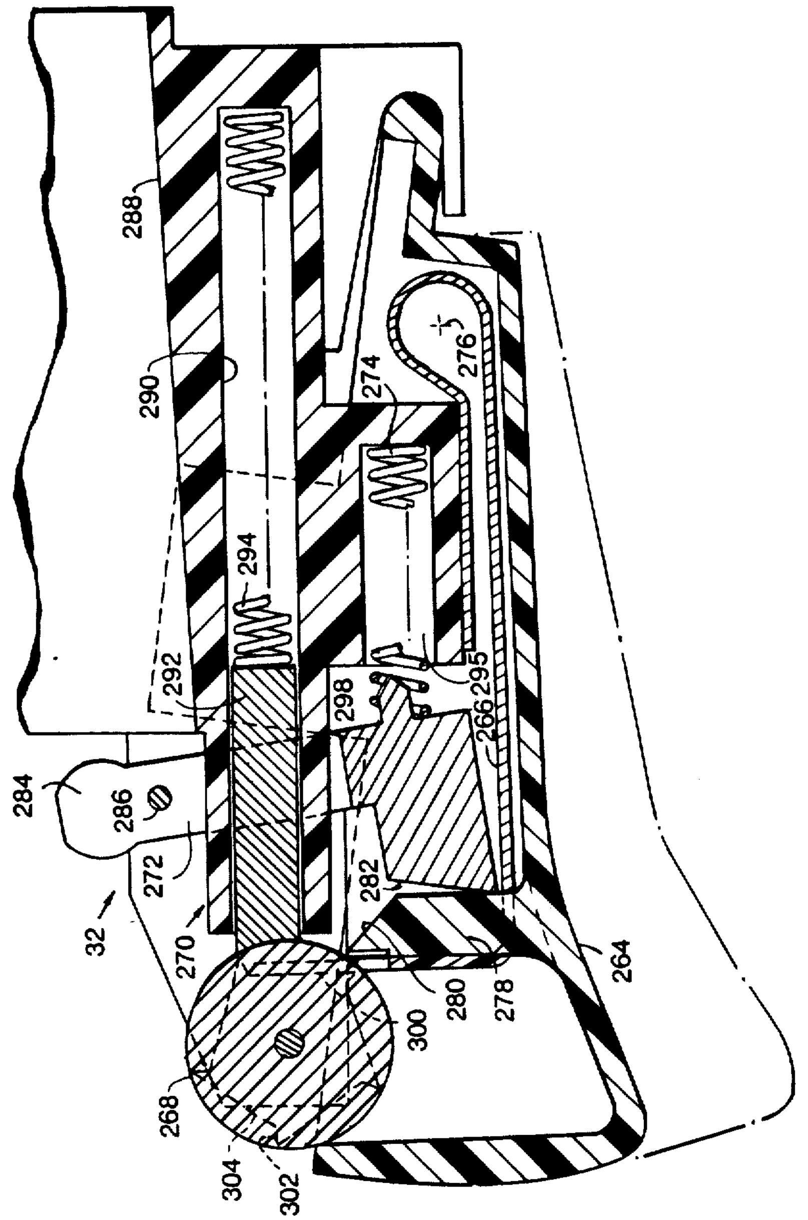
FIG. 11 is a sectioned elevational view of the ignition mechanism of the flashlight of FIG. 1, showing the relative positioning of the various elements thereof immediately following ignition.

Ignition assembly 32 is shown in FIGS. 4 and 5 prior to ignition, and in FIG. 11, the disposition of its various components are shown immediately following ignition, identical reference numerals being used in the three figures to identify the same elements.

Ignition assembly 32 is disposed within an opening 262 provided in housing section 12 and generally includes a pivoted actuation lever 264 biased by a hairpin-shaped leaf spring 266, a flint wheel 268, a flint cartridge 270 and a valve-actuating lever 272, biased toward a return position by a coil spring 274.

Lever 264, rotatable about a pivotal axis 276 is provided with an inwardly projecting portion 278 terminating in an inclined camming surface 280, which is disposed adjacent a cam following surface 282 provided on one arm of lever 272. The other arm of lever 272 terminates in a bifurcated fork 284, disposed so as to straddle holder 232 intermediate of annular flanges 250 and 252. Lever 272 pivots about a pivot pin 286 anchored within housing section 12.

A flint cartridge housing 288 is integrally formed as an internal portion of housing section 12 and has a blind hole 290, wherein is disposed a flint 292 and a coil spring 294 for biasing flint 292 against flint wheel 268. Housing 288 is also provided with a second blind hole 295, wherein is disposed coil spring 274, the projecting end of which encircles a retainer pin 298 provided on the outwardly projecting arm of lever 272.

Leaf spring 266 terminates in an inwardly projecting spur portion 300, aligned in opposition to the teeth 302 of a sprocket 304 rotationally fixed coaxially with respect to flint wheel 268.

As is most clearly shown in FIG. 4, the distance by which camming surface 280 is offset from cam following surface 282 is significantly less than the offset between spur 300 and teeth 302. As discussed below, such alignment provides delay means for delaying spark production for a short period of time following the initiation of pilot gas flow.

Additionally, and referring most particularly to FIG. 5, it will be seen that pilot assembly 30 and ignition assembly 32, while aligned substantially vertically with respect to one another, are both horizontally offset with respect to mantle assembly 28, thereby minimizing the flint debris which strikes and/or accummulates on mantle 34.

When switch 144 is moved rearward, fully evaporated gaseous fuel at a desired and limited pressure is supplied via grooves 78 and 82 to mantle assembly 28 and pilot assembly 30. The fuel is mixed with air, traverses mantle assembly 28 and is emitted within mantle 34. However, within pilot assembly 30, the fuel flow is temporarily blocked by seal 238 in pilot stem 230.

With fuel thus supplied to mantle assembly 28, the operator depresses actuation lever 264 of ignition assembly 32, causing lever 272 to undergo a counterclockwise rotation as viewed in FIG. 4 due to the camming action between surfaces 280 and 282. Due to the engagement of fork 284 with flanges 250 and 252, holder 232 moves forward relative to stem 230, displacing valve seal 238 forward and permitting the flow of gaseous fuel to the forward opening of holder 232.

In ignition assembly 32, spark production is delayed for a short time following the displacement of valve seal 238 to allow time for pilot fuel to traverse stem 230 and holder 232. Thus, a short time following displacement of valve seal 238, spur 300 strikes one of sprocket teeth 302, causing rotation of flint wheel 268 and spark production. The sparks are directed to the forward opening of holder 232 to ignite the air/gas mixture now issuing therefrom. The resulting pilot flame is of sufficient intensity to ignite the gaseous fuel now enveloping mantle 34.

Mantle 208, now enveloped in burning fuel will become incandescent and emit a degree of light which will remain substantially constant for an extended period of time until all the fuel has been consumed.

In an experimental prototype, having a tank pressure of 30 psi, a tank capacity of 20 grams of liquid isobutane and a mantle fuel flow of 1 gram/hr., a light output of approximately 10 lumens was achieved over a period of approximately 20 hours, yielding a total light output of approximately 200 lumen-hours. In comparison, a typical commercial flashlight powered by two carbon/zinc D cell batteries has a comparable initial light output, but the light output drops significantly with extended use.

Operation of the flashlight is terminated by the operator effecting a forward movement of switch 144, thereby mating valve face 128 and valve seat 110 and cutting off the flow of fuel from first regulator stage 52.

The foregoing description is by way of illustration and not of limitation. Various substitutions of equivalents may be made of those skilled in the art which do not depart from the spirit and scope of the invention, as set forth in the following claims.

What is claimed as new and desired to be secured by Letters Patent of the United States is:

1. A regulator particularly adapted for use in a hand-held device powered by liquefied gas, comprising:
   - a first chamber having a fuel inlet port;
   - a first diaphragm dividing said first chamber into upstream and downstream compartments, said upstream compartment being in fluid communication with said fuel inlet port;
   - first valve means for maintaining a predetermined pressure difference between said upstream and downstream compartments;
   - a second chamber having a fuel outlet port and including a second diaphragm;
   - second valve means for establishing fluid communication between said downstream compartment and said second chamber whenever the pressure in said second chamber falls below a predetermined level and for blocking fluid communication between said downstream compartment and said second chamber whenever the pressure in said second chamber equals or exceeds said predetermined level;
   - positive shutoff means for blocking fluid communication between said downstream compartment and said second chamber, independent of the pressure in said second chamber; and
   - first adjusting means for adjusting said predetermined pressure difference.

2. The regulator of claim 1, further comprising second adjusting means for adjusting said predetermined level.

3. The regulator of claim 2, wherein said first valve means comprises a throughgoing aperture in said first diaphragm, a first valve face surrounding said aperture, a first valve seat disposed within said upstream compartment and first biasing means for biasing said first valve face against said first valve seat.

4. The regulator of claim 3, wherein said second valve means comprises a passageway between said downstream compartment and said second chamber, a second valve seat surrounding the termination of said passageway in said downstream compartment, a second valve face disposed within said downstream compartment, said first biasing means also biasing said second valve face against said second valve seat, and means for displacing said second valve face away from said second valve seat whenever the pressure in said second chamber falls below said predetermined level.

5. The regulator of claim 4, wherein said displacement means comprises a valve stem connected to said second valve face, extending through said passageway and terminating adjacent said second diaphragm, such that movement of said second diaphragm toward said passageway displaces said second valve face away from said second valve seat.

6. The regulator of claim 5, wherein said first adjusting means comprises a threaded plug and a corresponding threaded opening in said upstream compartment, said first valve seat being mounted on said threaded plug.

7. The regulator of claim 6, wherein said second adjusting means comprises a second biasing means for biasing said second diaphragm toward said valve stem and means for varying the force exerted on said second diaphragm by said second biasing means.

8. The regulator of claim 7, wherein said positive shutoff means comprises means for moving said second diaphragm away from said valve stem.

9. The regulator of claim 8, wherein said movement means includes an elongated member attached to said second diaphragm.

10. The regulator of claim 9, wherein said first biasing means is a spring member.

* * * * *